United States Patent
Kaltenrieder et al.

(10) Patent No.: US 8,867,321 B2
(45) Date of Patent: Oct. 21, 2014

(54) WATCH COMPRISING A ZEBRA CONNECTOR FOR ELECTRICAL CONNECTION BETWEEN A DIGITAL DISPLAY DEVICE AND A PRINTED CIRCUIT BOARD AND METHOD OF ASSEMBLING SUCH A WATCH

(75) Inventors: Andre Kaltenrieder, Preles (CH); Martin Jufer, Melchnau (CH); Christian Racine, Malleray-Bevilard (CH); Jean-Luc Bovet, Solothurn (CH); Jerome Grosjean, Orvin (CH)

(73) Assignee: Eta Sa Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 13/977,133

(22) PCT Filed: Nov. 9, 2011

(86) PCT No.: PCT/EP2011/069745
§ 371 (c)(1),
(2), (4) Date: Jun. 28, 2013

(87) PCT Pub. No.: WO2012/097892
PCT Pub. Date: Jul. 26, 2012

(65) Prior Publication Data
US 2013/0279303 A1 Oct. 24, 2013

(30) Foreign Application Priority Data
Jan. 18, 2011 (EP) .................................... 11151273

(51) Int. Cl.
*G04B 19/00* (2006.01)
*G04G 17/06* (2006.01)
*G04G 17/04* (2006.01)
*B29C 65/08* (2006.01)

(52) U.S. Cl.
CPC .............. *G04G 17/045* (2013.01); *G04G 17/06* (2013.01); *B29C 65/08* (2013.01)
USPC ....................................................... 368/223

(58) Field of Classification Search
CPC ... G04G 17/045; G04G 17/06; G04G 9/0082; G04G 9/02; G04B 45/0007; G04B 19/065; G04B 19/082
USPC ............... 368/223, 82–84, 88, 239–242, 276, 368/281, 286, 289, 291–292, 297–300, 309
See application file for complete search history.

(56) References Cited

U.S. PATENT DOCUMENTS 4,281,406 A   7/1981  Tanaka
5,172,348 A * 12/1992  Paratte ........................... 368/47

(Continued)

FOREIGN PATENT DOCUMENTS

EP   0 460 526 A1   12/1991
EP   1 122 620 A1    8/2001

OTHER PUBLICATIONS

International Search Report for PCT/EP2011/069745 dated Jan. 25, 2012.

*Primary Examiner* — Edwin A. Leon
(74) *Attorney, Agent, or Firm* — Sughrue Mion, PLLC

(57) ABSTRACT

Method of ultrasonic welding a watch crystal, the watch including a middle part which, with the crystal, delimits a watch case, the crystal including a top face oriented towards the user and an opposite bottom face oriented towards the watch cases, a digital display device being fixed to the bottom face of the crystal, a printed circuit board being disposed inside the watch case, underneath and remote from the digital display device, the digital display device being electrically connected to the printed circuit board by means of a zebra electrical connector, wherein, as the crystal is abutting on a shoulder arranged in the middle part, the ultrasounds are directed onto the shoulder to melt the shoulder and to lower the level of the crystal in the direction of the printed circuit board, so that the zebra connector is compressed between the digital display device and the printed circuit board.

5 Claims, 3 Drawing Sheets

(56) References Cited

U.S. PATENT DOCUMENTS

| | | | |
|---|---|---|---|
| 6,292,439 B1 * | 9/2001 | Akiba et al. | 368/84 |
| 6,603,710 B1 * | 8/2003 | Pantet et al. | 368/84 |
| 2006/0133213 A1 * | 6/2006 | Robert et al. | 368/11 |

* cited by examiner

WATCH COMPRISING A ZEBRA CONNECTOR FOR ELECTRICAL CONNECTION BETWEEN A DIGITAL DISPLAY DEVICE AND A PRINTED CIRCUIT BOARD AND METHOD OF ASSEMBLING SUCH A WATCH

CROSS REFERENCE TO RELATED APPLICATIONS

This is a National Phase Application in the United States of International Patent Application PCT/EP 2011/069745 filed Nov. 9, 2011, which claims priority on European Patent Application No. 11151273.7 of Jan. 18, 2011 The entire disclosures of the above patent applications are hereby incorporated by reference.

FIELD OF THE INVENTION

The present invention concerns a method of ultrasonic welding a crystal to the middle part of a watch. More specifically, the present invention concerns a welding method of this type which guarantees a good electrical contact between a display device fixed to the bottom face of the crystal and a remote printed circuit board disposed underneath the display device.

BACKGROUND OF THE INVENTION

In the field of industrial fabrication, it is always sought to automatise as far as possible the various steps for fabricating a product, for economical reasons as much as a desire to achieve the highest possible level of reliability. The large scale fabrication of watches is no exception to this rule. In this field, the fixing quality of the various components and the reliability of the electrical connections are determining factors. Indeed, the sealing of the watch, in particular, depends upon the fixing quality of its components. Moreover, reliable electrical connections guarantee that the watch will operate properly over time.

The present invention concerns an electronic watch with a digital time display. This watch comprises, in particular, bonded to the inner face of the crystal, a digital display device such as a liquid crystal display cell connected by means of a zebra connector to a printed circuit board on which are mounted the various electronic components controlling the watch. The printed circuit board is housed inside the watch case, underneath and remote from the digital display device.

Two types of problem were encountered during the fabrication of the first prototypes of this watch. Firstly, it was realised that the electrical contact between the display device and the printed circuit board was not always reliable. Consideration was also given as to the best method of fixing the crystal to the middle part of the watch so as to guarantee the sealing of the watch.

SUMMARY OF THE INVENTION

It is an object of the present invention to overcome these problems by proposing to improve the reliability of the electrical connection between the digital display device and the printed circuit board. At the same time, it has been sought to fix the watch crystal by means of ultrasonic welding. Indeed, it is known that ultrasonic welding secures the crystal to the watch middle part in a perfectly sealed and long-lasting manner.

These objects are achieved as a result of the present invention which discloses a watch comprising a middle part which, with a crystal, delimits a watch case. The crystal comprises a top face oriented towards the user and an opposite bottom face oriented towards the watch case. A digital display device is fixed to the bottom face of the crystal and a printed circuit board is disposed inside the watch case, underneath and remote from the digital display device. The digital display device is electrically connected to the printed circuit board by means of a zebra-type electrical connector and the crystal abuts on a shoulder arranged in the middle part. The watch is characterized in that the height of the shoulder in relation to the printed circuit board is such that, when the crystal is secured to the shoulder, the zebra connector is compressed between the digital display device and the printed circuit board.

According to another aspect, the present invention teaches a method of ultrasonic welding a watch crystal, wherein the watch comprises a middle part which, with the crystal, delimits a watch case, the crystal comprising a top face oriented towards the user and an opposite bottom face oriented towards the watch case. A digital display device is fixed to the bottom face of the crystal and a printed circuit board is disposed in the watch case, underneath and remote from the digital display device. The digital display device is electrically connected to the printed circuit board by means of a zebra-type electrical connector. This method is characterized in that, the crystal abutting on a shoulder arranged in the middle part, the ultrasounds are directed onto the shoulder to melt the shoulder and lower the level of the crystal in the direction of the printed circuit board, so that the zebra connector is compressed between the liquid crystal display cell and the printed circuit board.

According to a first variant of the invention, prior to the ultrasonic welding step, the zebra connector is in a non-stressed state.

According to a second variant of the invention, after the ultrasonic welding step, the zebra connector is in a compressed state.

As a result of these features, the present invention provides a timepiece wherein the level of the crystal in relation to a printed circuit board disposed inside the watch case is such that, when the crystal is secured to the middle part of the watch, a zebra connector will provide the electrical connection with an optimum compression rate between the printed circuit board and a digital display device fixed underneath the crystal. It is therefore possible, in a single step, to guarantee both the fixing of the crystal to the middle part, the sealing of the system and a reliable electrical connection between the display device and the printed circuit board which carries the electronic components necessary for proper operation of the display device.

Ultrasonic welding is performed using a sonotrode. When the sonotrode is placed against the watch crystal, the crystal abuts against the shoulder of the middle part which acts as an energy guide and the zebra connector is pre-stressed. The zebra connector will be still further stressed when the crystal is welded to the middle part. Indeed, as a result of the input of vibrating energy, the shoulder melts and the level of the crystal is lowered in the direction of the printed circuit board.

The present invention also discloses an ultrasonic welding method which simultaneously secures the crystal to the middle part of the watch and provides a reliable electrical connection between the digital display device and the printed circuit board on which are mounted the electronic components necessary for proper operation of the display device. It is known that ultrasonic welding secures the crystal to the middle part of the watch in a perfectly sealed and durable manner. Moreover, during ultrasonic welding, at least one portion of the shoulder of the middle part on which the crystal is abutting melts, which lowers the level of the display device in relation to the printed circuit board. Since the space between the display device and the printed circuit board is reduced, the display device subjects the zebra connector to optimum compression, which means that the zebra connector provides a reliable electrical connection between the display device and the printed circuit board.

BRIEF DESCRIPTION OF THE DRAWINGS

Other features and advantages of the present invention will appear more clearly from the following detailed description of an implementation of the method according to the invention, this example being given purely by way of non-limiting illustration with reference to the annexed drawing, in which.

DETAILED DESCRIPTION OF THE INVENTION

The present invention proceeds from the general inventive idea consisting in providing a timepiece whose crystal is fixed at such a level that, in a single fabrication step, it is possible both to secure the bezel to the middle part and to provide a reliable electrical connection for the electronic components.

In a particularly advantageous embodiment of the invention, the crystal is ultrasonic welded onto the middle part of the watch. The crystal includes, on the bottom face thereof, a digital display device connected, via a zebra connector, to a printed circuit board on which are mounted at least the electronic components necessary for proper operation of the display device. The benefit of this method is twofold: first, ultrasonic welding secures the bezel to the middle part of the watch in a perfectly sealed and durable manner and, secondly, the electrical connection between the digital display device and the printed circuit board is reliable. Indeed, as a result of the increase in temperature generated by ultrasonic welding, one portion of the middle part (also called the shoulder), which acts as an energy guide, is consumed, which causes a lowering of the level of the crystal and therefore of the display device in relation to the printed circuit board which matches the desired compression of the zebra connector. As the display device moves closer to the printed circuit board, the zebra connector is compressed in accordance with the supplier's instructions and thus provides a perfect electrical connection.

Figure 1:
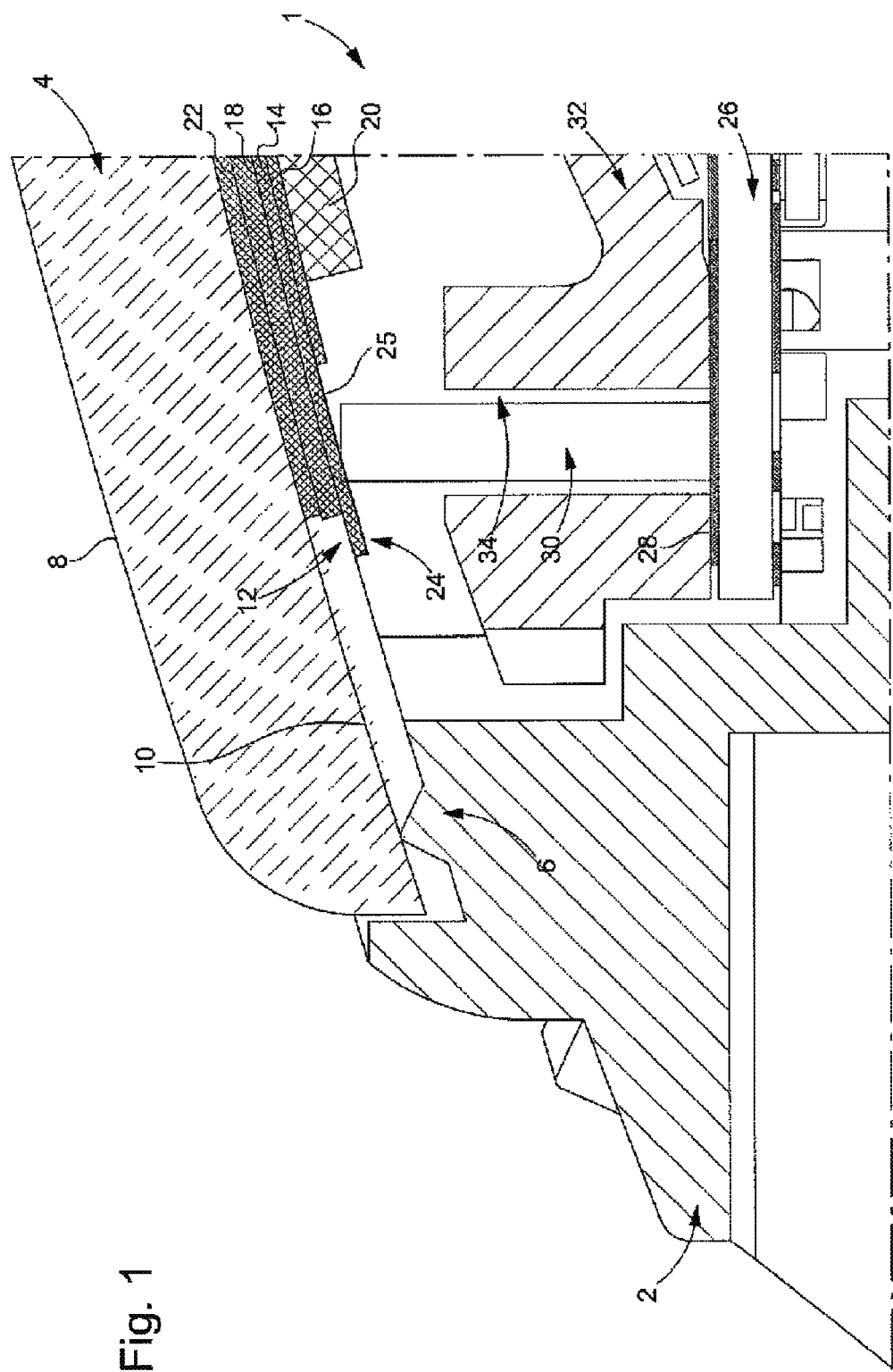
FIG. 1 is a partial cross-section of a watch case for implementing the method according to the invention prior to the ultrasonic welding step.

FIG. 1 is a partial cross-section of a watch case for implementing the method according to the invention prior to the ultrasonic welding step. Designated as a whole by the general reference numeral 1, this watch case is delimited by a middle part 2 and a watch crystal 4. Middle part 2 and watch crystal 4 are made of materials suitable for ultrasonic welding. Crystal 4 abuts on a shoulder 6 of middle part 2. As will be seen in detail below, shoulder 6 acts as an energy guide and initiates the melting of the plastic materials forming these two contacting components as soon as the ultrasonic beam used to secure watch crystal 4 to middle part 2 is switched on.

Watch crystal 4 has two surfaces, namely a top surface 8 facing the watch user side and a bottom surface 10 facing the watch case 1 side. A digital display device is fixed to the bottom surface 10 of the crystal. Purely by way of non-limiting example, this digital display device may be a liquid crystal display cell 12 made of flexible plastic comprising a front substrate 14 and a rear substrate 16 extending parallel and at a distance from each other and joined to each other by a sealing frame (not shown in the drawing) which delimits a sealed volume for confining the liquid crystal. The two front 14 and rear 16 substrates are arranged between first and second polarisers, respectively 18 and 20, with crossing directions of polarisation. The assembly formed by the two substrates 14 and 16 and the two polarisers 18 and 20 is bonded by means of a film of optical adhesive 22 to the bottom surface 10 of watch crystal 4.

It can be seen upon examining FIG. 1 that the dimensions of front substrate 14 exceed those of rear substrate 16. This forms a contact surface 24, onto which the conductive paths 25 open out for the electrical connection of the control electrodes of display cell 12 to the electronic control components (not shown) of cell 12. These electronic control components are mounted on a printed circuit board 26 arranged inside watch case 1, underneath display cell 12 and at a distance therefrom. According to the invention, the conductive paths 25 for the electrical connection of the control electrodes of liquid crystal display cell 12 are connected to corresponding conductive paths 28 structured on the surface of the printed circuit board 26 by means of an elastomer connector 30 which extends substantially vertically. It will be recalled that an elastomer connector, also known by the commercial name of a zebra connector, is a flexible connector formed of a plurality of conductive sheets separated from each other by elastomer insulating sheets. The assembly is completed by a light guide 32 which is carried by the printed circuit board 26 and which is used to back light liquid crystal display cell 12. It will be noted that light guide 32 includes a slot 34 for guiding and vertically holding zebra connector 30.

As shown in FIG. 1, zebra connector 30 is in a non-stressed state before watch crystal 4 is ultrasonic welded to middle part 2. It will be noted that, for the purposes of the present invention "compressed" means that the height of the zebra connector is lower than its height when no stress is exerted thereon.

Figure 2:
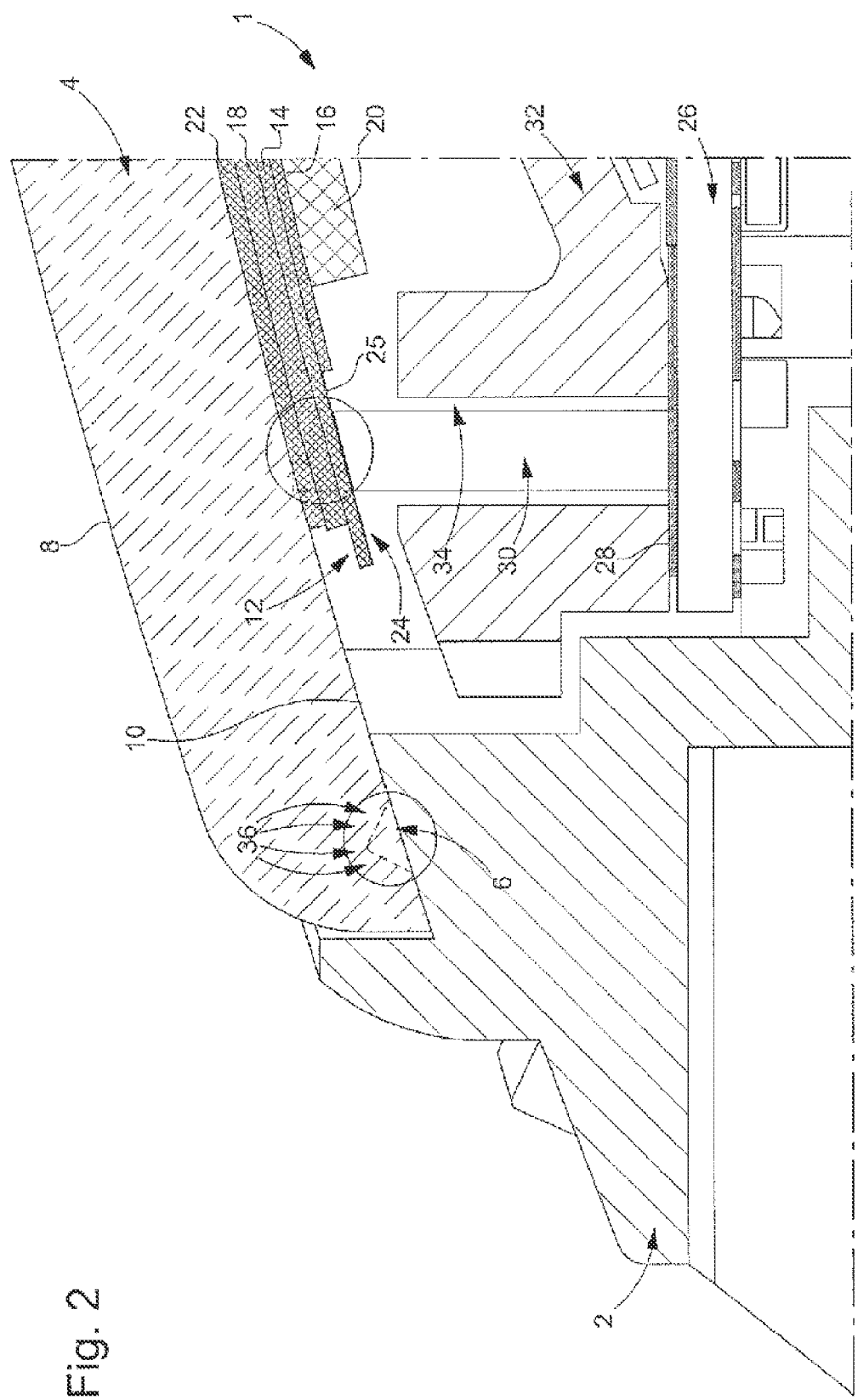
FIG. 2 is an identical view to that of FIG. 1, after the ultrasonic welding step.

As already mentioned above, watch crystal 4 abuts on a shoulder 6 of middle part 2 (see FIG. 2). This shoulder 6 serves as an energy guide for the vibrating energy used for welding watch crystal 4 to middle part 2. Therefore, according to the method of the invention, the ultrasounds are directed at 36 onto shoulder 6 to melt shoulder 6 and to lower the level of crystal 4 in the direction of printed circuit board 26, so that zebra connector 30 is compressed between liquid crystal display cell 12 and printed circuit board 26. The fraction of shoulder 6 which is consumed during welding and the decrease in height of zebra connector 30 resulting from compression are shown in dotted lines in the areas surrounded by a circle in FIG. 2. By way of example, the compression rate of zebra connector 30 after welding is around 15%.

Thus, as a result of the method of the invention, watch crystal 4 is welded to middle part 2 by means of ultrasounds, which guarantees a perfectly sealed and durable weld and, simultaneously, zebra connector 30 is compressed, which guarantees a reliable electrical connection between liquid crystal cell 12 and the electronic control components of cell 12 mounted on printed circuit board 26.

Figure 3:
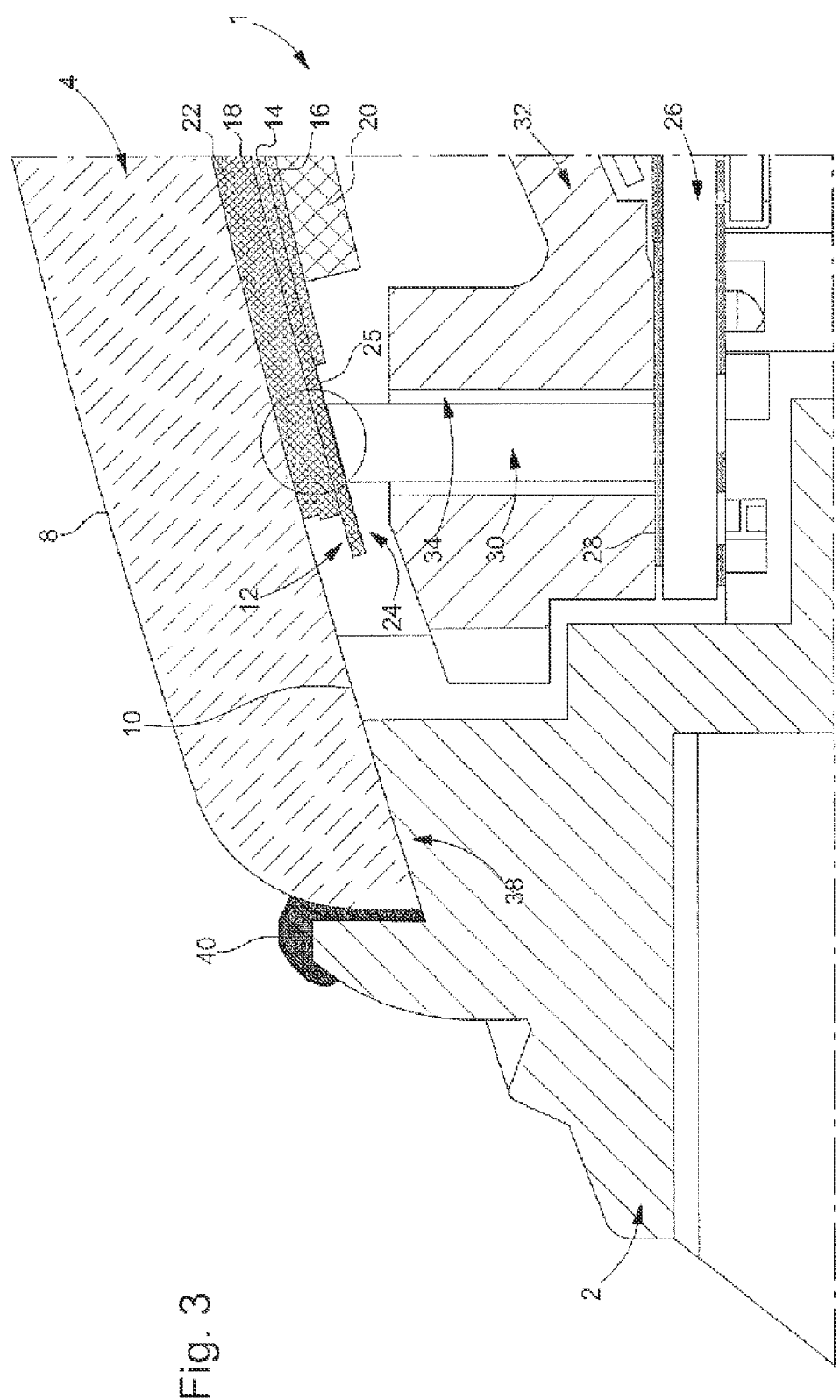
FIG. 3 is a partial cross-section of a watch case according to a second aspect of the invention.

FIG. 3 illustrates another aspect of the present invention. In this Figure, those elements which are identical to those described above with reference to FIGS. 1 and 2 will be designated by the same reference numerals. FIG. 3 shows that watch crystal 4 is abutting on a shoulder 38 of middle part 2, whose elevation or height relative to printed circuit board 26 is such that zebra connector 30 is compressed when crystal 4 is placed on shoulder 38. In other words, the height of zebra connector 30 is lower than the height thereof in a completely non-stressed state. This difference represents the zebra connector compression rate recommended by the supplier. Owing to this feature, a reliable electrical connection is guaranteed between liquid crystal display cell 12 and printed circuit board 26. Watch crystal 4 is secured to watch middle part 2 by means of a line of adhesive 40.

It goes without saying that this invention is not limited to the embodiment that has just been described and that various simple alterations and variants could be envisaged by those skilled in the art without departing from the scope of the invention as defined by the annexed claims. In particular, in order to reduce losses as far as possible, the display device could be electrically checked prior to welding, by pressing the crystal, to which the liquid crystal display device is fixed, as far as possible against the energy guide of the middle part. The zebra connector is therefore compressed and provides a good electrical connection between the display device and the printed circuit board components, which allows any necessary tests to be carried out.

The invention claimed is:

1. A watch comprising a middle part which, with the crystal, delimits a watch case, the crystal comprising a top face oriented towards the user and an opposite bottom face oriented towards the watch case, a digital display device being fixed to the bottom face of the crystal, a printed circuit board being disposed inside the watch case, underneath and remote from the digital display device, the digital display device being electrically connected to the printed circuit board by means of a zebra electrical connector, the crystal abutting on a shoulder arranged in the middle part, wherein the shoulder protrudes from the middle part so that, before ultrasonic welding of the crystal on the middle part, the crystal is not in contact in its final position with the crystal, the height of the shoulder with respect to the printed circuit board being so that, after consumption of the shoulder during the ultrasonic welding, the zebra connector is compressed between the digital display device and the printed circuit board.

2. A method of ultrasonic welding a watch crystal, wherein the watch comprises a middle part which, with the crystal, delimits a watch case, the crystal comprising a top face oriented towards the user and an opposite bottom face oriented towards the watch case, a digital display device being fixed to the bottom face of the crystal, a printed circuit board being disposed inside the watch case, underneath and remote from the digital display device, the digital display device being electrically connected to the printed circuit board by means of a zebra electrical connector, wherein the method comprises the steps of:

placing the crystal in abutment on a shoulder arranged in the middle part, the shoulder protruding from the middle part so that, before ultrasonic welding of the crystal on the middle part, the crystal is not in contact in its final position with the crystal, and directing the ultrasonic vibrations onto the shoulder to melt said shoulder and to lower the level of the crystal in the direction of the printed circuit board, so that the zebra connector is compressed between the digital display device and the printed circuit board.

3. The method according to claim 2, wherein, prior to the ultrasonic welding step, the zebra connector is in a non-stressed state.

4. The method according to claim 2, wherein, after the ultrasonic welding step, the zebra connector is in a compressed state, providing an optimum electrical connection.

5. The method according to claim 3, wherein, after the ultrasonic welding step, the zebra connector is in a compressed state, providing an optimum electrical connection.

* * * * *